United States Patent [19]
Downey

[11] Patent Number: 6,010,190
[45] Date of Patent: Jan. 4, 2000

[54] SEAT TRACK WITH CAM ACTUATED LOCKING DEVICE AND BYPASS ASSEMBLY

[75] Inventor: Hugh D. Downey, Barrie, Canada

[73] Assignee: Meritor Automotive Canada, Inc., Bracebridge

[21] Appl. No.: 09/087,107

[22] Filed: May 29, 1998

[51] Int. Cl.[7] ...................................................... B60N 2/00
[52] U.S. Cl. .......................................... 297/340; 297/331
[58] Field of Search ..................................... 297/340, 341, 297/331, 378.1, 335; 248/429

[56] References Cited

U.S. PATENT DOCUMENTS

| | | | |
|---|---|---|---|
| 4,159,147 | 6/1979 | Kiyomitsu et al. | 297/341 |
| 4,440,442 | 4/1984 | Drouillard et al. | 297/341 |
| 4,512,609 | 4/1985 | Pärsson | 297/331 |
| 5,482,349 | 1/1996 | Richter et al. | 297/341 X |
| 5,570,931 | 11/1996 | Kargilis et al. | 297/341 X |
| 5,795,023 | 8/1998 | Kayumi | 297/331 |

*Primary Examiner*—Milton Nelson, Jr.
*Attorney, Agent, or Firm*—Howard & Howard

[57] ABSTRACT

A vehicle seat assembly includes a seat back pivotally supported with respect to a seat bottom. The seat bottom is moveable between a generally horizontal position and a generally upright position and the seat back is moveable between a generally horizontal and upright position. The seat assembly is attached to the vehicle by a mounting assembly. The mounting assembly includes a locking device mounted on an upper track that moves relative to a lower track. The locking device moves between a locked position where the upper track cannot move with respect to the lower track and an unlocked position where the upper track can move with respect to the lower track. A release member is used to move the locking device between the locked and unlocked positions. A bypass member is supported on the second track and can be rotated independently from the release member. When an occupant wishes to disengage the locking device to slid the seat assembly forward, the bypass member and the release member rotated together to move the locking device out of the locked position. When the occupant wishes to fold the seat down to increase available cargo space, the seat bottom is pivoted into the vertical position and the seat back is pivoted into a horizontal position which causes the bypass member to rotate independently from the release member such that the locking device remains in the locked position. Additionally, after the locking device is disengaged, the bypass member can also be rotated independently from the release member allowing the locking device to be re-engaged independent of how the release member was actuated.

20 Claims, 4 Drawing Sheets

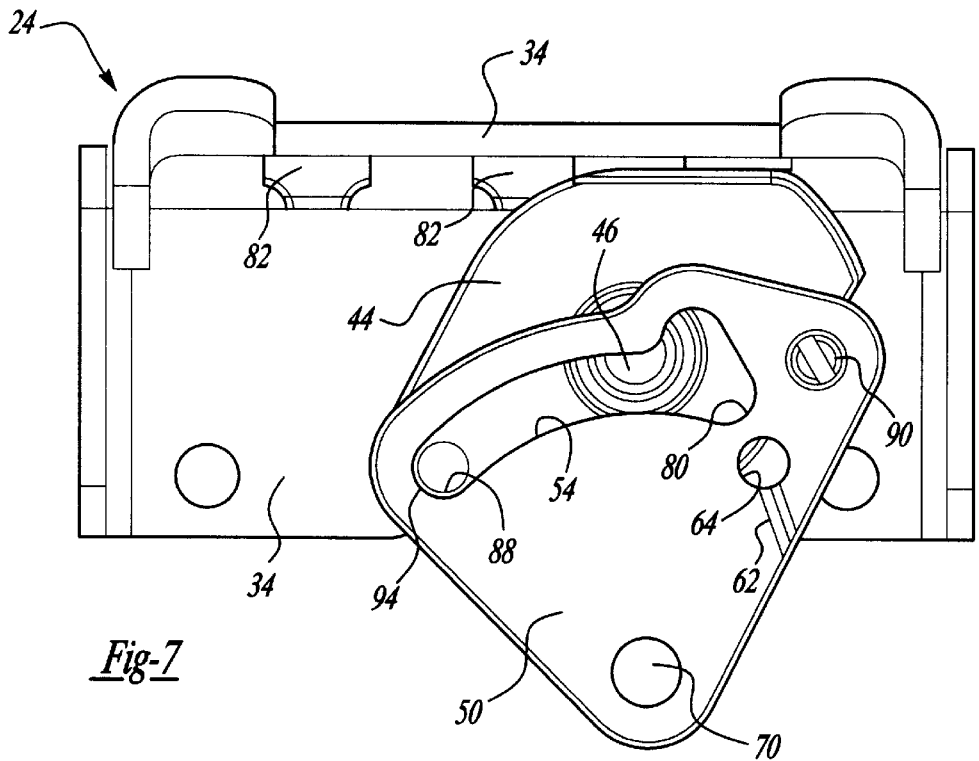
_Fig-7_
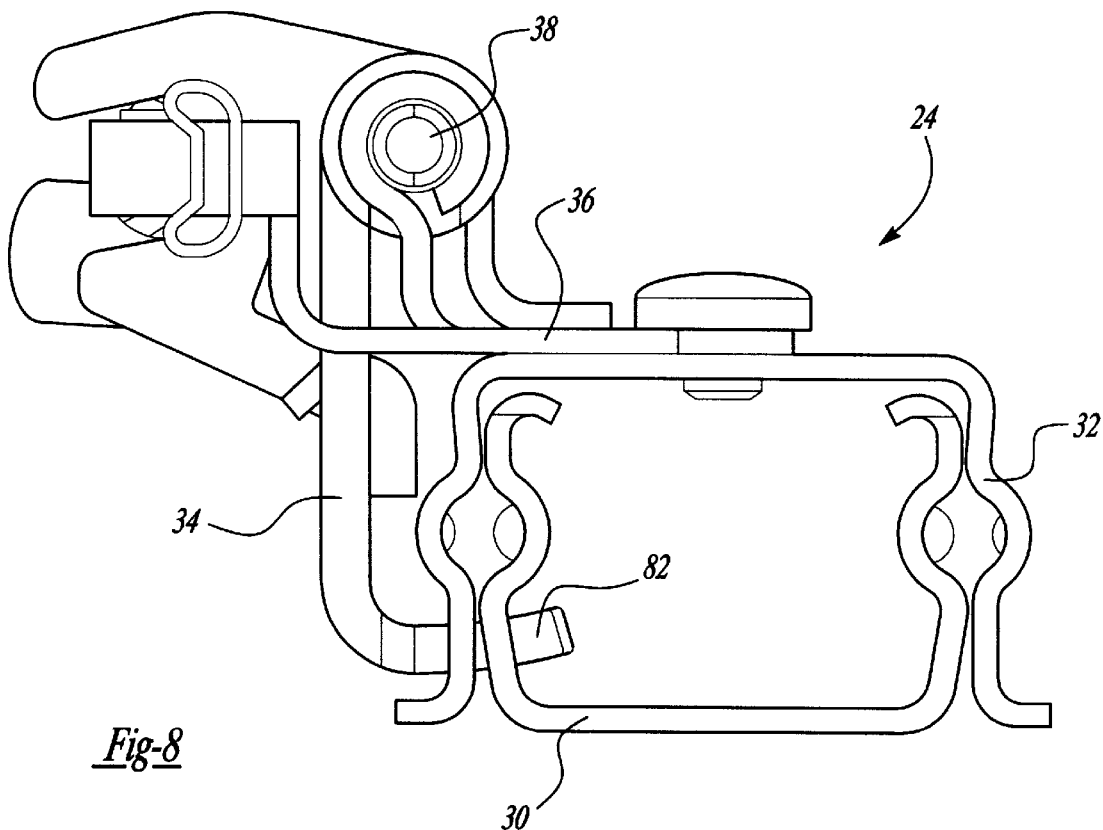
_Fig-8_

SEAT TRACK WITH CAM ACTUATED LOCKING DEVICE AND BYPASS ASSEMBLY

BACKGROUND OF THE INVENTION

This application relates generally to an assembly for mounting a seat within a vehicle. More particularly, this invention relates to a seat mounting assembly with a locking device that is engaged by a release member to move the locking device between a locked position and an unlocked position and a bypass member that allows a pivotal movement of a seat member without disengaging the lock device or moving the release member.

Seat track arrangements for mounting seats within vehicles are generally well known. Most arrangements provide for a seat to be moved or adjusted in forward and rearward directions within a vehicle.

In many circumstances, it is desirable to have seats within a vehicle that include a seat back that is pivotally supported on a seat bottom such that the seat back can be folded forward and downward relative to the seat bottom. Such an arrangement is necessary, for example, in vehicles so that a passenger can have access into the area behind the seat. It is also desirable for a seat in a vehicle to be able to slide forward to allow easier access to the area behind the seat. In some vehicles, the seat bottom can be pivoted forwardly into a vertical position and the seat back can be pivoted downwardly and forwardly into a horizontal position to increase available cargo space in a vehicle.

When the seat back is pivoted downwardly to increase cargo space, it is undesirable for the seat to slide forward. Thus, a mounting assembly including two (2) different mounting mechanisms is often required in order to provide the sliding forward function and the folding down function without sliding forward.

These mounting assemblies that are used to mount the seat to the vehicle are often complex, especially when the mounting assembly includes the dual capability of being able to adjust the seat in forward and rearward directions and being able to slide the seat forward when the seat back is pivoted toward the seat bottom. These complex mounting assemblies require a great number of components which increases the assembly time and the overall cost of the seat assembly.

Accordingly, it is desirable to provide a single simplified and inexpensive seat mounting assembly that includes seat sliding capability when the seat back is pivoted downwardly and which includes a bypass mechanism to prevent the seat from sliding forward when the seat is positioned to increase cargo space in the vehicle. It is also desirable for the mounting assembly to be durable, easy to operate, and quiet.

SUMMARY OF THE INVENTION

In general terms, this invention is a vehicle seat assembly with a seat back pivotally supported with respect to a seat bottom, and which is attached to the vehicle by a mounting assembly. A first track is attached to the vehicle and a second track is supported on the second track such that the second track can move forwardly and rearwardly with respect to the first track. The mounting assembly includes a locking device mounted on the second track that moves relative to the first track. The locking device moves between a locked position where the upper track cannot move with respect to the lower track and an unlocked position where the upper track can move with respect to the lower track. A release member is actuated by a control member and is used to move the locking device between the locked and unlocked positions. A bypass member is supported on the second track and can be rotated independently from the release member to allow the seat back to be pivoted downwardly without disengaging the locking device. Also the bypass member can be selectively moved into a bypass position when the locking device is in the unlocked position such that the bypass member can move independently from the release member to allow the locking device to return to the locked position independent of the control member.

In a preferred embodiment of this invention, the vehicle seat assembly includes a seat bottom and a seat back pivotally supported for pivotal movement relative to the seat bottom. The assembly also includes a first track and a second track supported for movement relative to the first track with the seat bottom being supported on the second track for movement with the second track. A locking device is supported on the second track for movement into and out of a locked position where the locking device maintains the second track in a selected position relative to the first track. A release member is supported on the second track for selectively moving the locking device into and out of the locked position and a bypass member selectively moves into a bypass position where the locking device remains in the locked position while allowing the seat back to pivot relative to the second track.

The subject invention offers several advantages over prior art systems because it provides a simplified mounting for a seat within a vehicle that significantly reduces the number of required components and decreases overall assembly cost. The subject invention is also advantageous because it is durable, easy to assemble, and quiet in operation.

These and other features and advantages of the present invention will be best understood from the following specification and drawings, the following of which is a brief description.

BRIEF DESCRIPTION OF THE DRAWINGS

FIG. 7 is an overhead view of the preferred embodiment of the seat track assembly with the bypass member in the bypass position.

FIG. 8 is an end view of the seat track assembly shown in FIG. 3.

DETAILED DESCRIPTION OF THE PREFERRED EMBODIMENT

Figure 1:
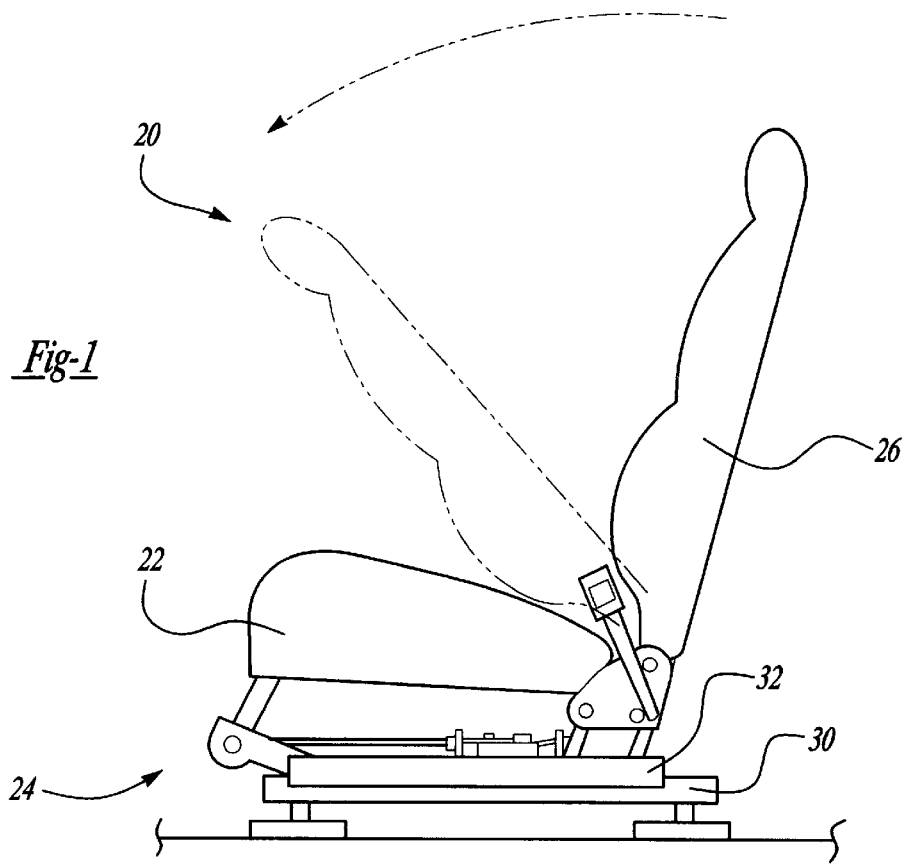
FIG. 1 is a side view of a seat with a seat track mounting assembly designed according to this invention.

FIG. 1 illustrates a vehicle seat assembly 20. The seat assembly 20 includes a seat bottom 22 that is mounted within the vehicle on a mounting assembly 24. A seat back 26 is pivotally supported for pivotal movement relative to the seat bottom 22 as indicated in phantom in FIG. 1.

Figure 2:
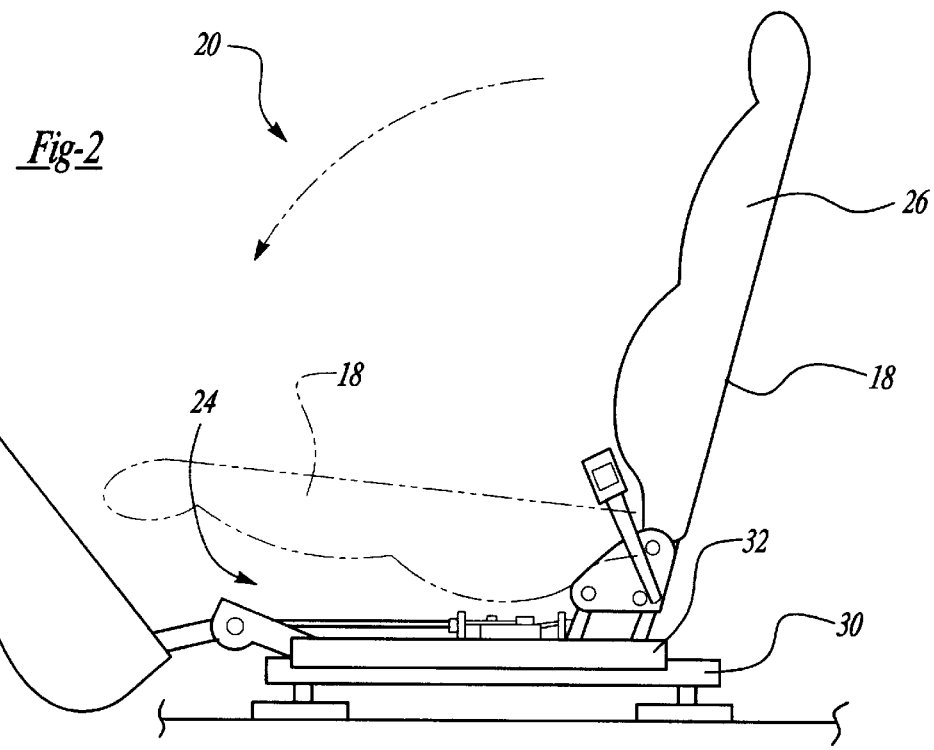
FIG. 2 is a side view of the seat shown in FIG. 1 with a seat bottom pivoted forwardly.

The mounting assembly 24 includes track assemblies on an inboard side and an outboard side of the seat assembly 20. FIG. 1, a side view of the seat 20, shows only the inboard side of the mounting assembly, however, it should be understood that a similar mounting assembly is located on the outboard side. The terms inboard and outboard are used in this description for clarity and illustration purposes only and cannot be considered limiting. As shown in FIG. 2, the mounting assembly 24 includes a first track 30 and a second track 32. The first track 30 is preferably a lower track 30 that is fixedly mounted to a frame of the vehicle, for example. The second track 32 is preferably an upper track 32 is received over the lower track 30 so that the upper track 32 can be moved in a forward or rearward direction relative to the lower track 30. The terms forward, rearward, upper, and lower, as used in this description, are for illustration purposes only and cannot be considered limiting. The profiles of the lower track 30 and the upper track 32 ensure that the upper track 32 only moves along a longitudinal axis of the tracks and does not move in other directions.

The seat 20 can also be folded down to achieve a load floor position. In this position, the seat bottom 22 is pivoted from a horizontal position to a generally vertical position. The seat back 26 is pivoted downwardly and forwardly from a vertical position to a horizontal position, as shown in phantom in FIG. 2. In this position, a back surface 18 of the seat back 26 serves as a floor for a rear cargo area.

Figure 3:
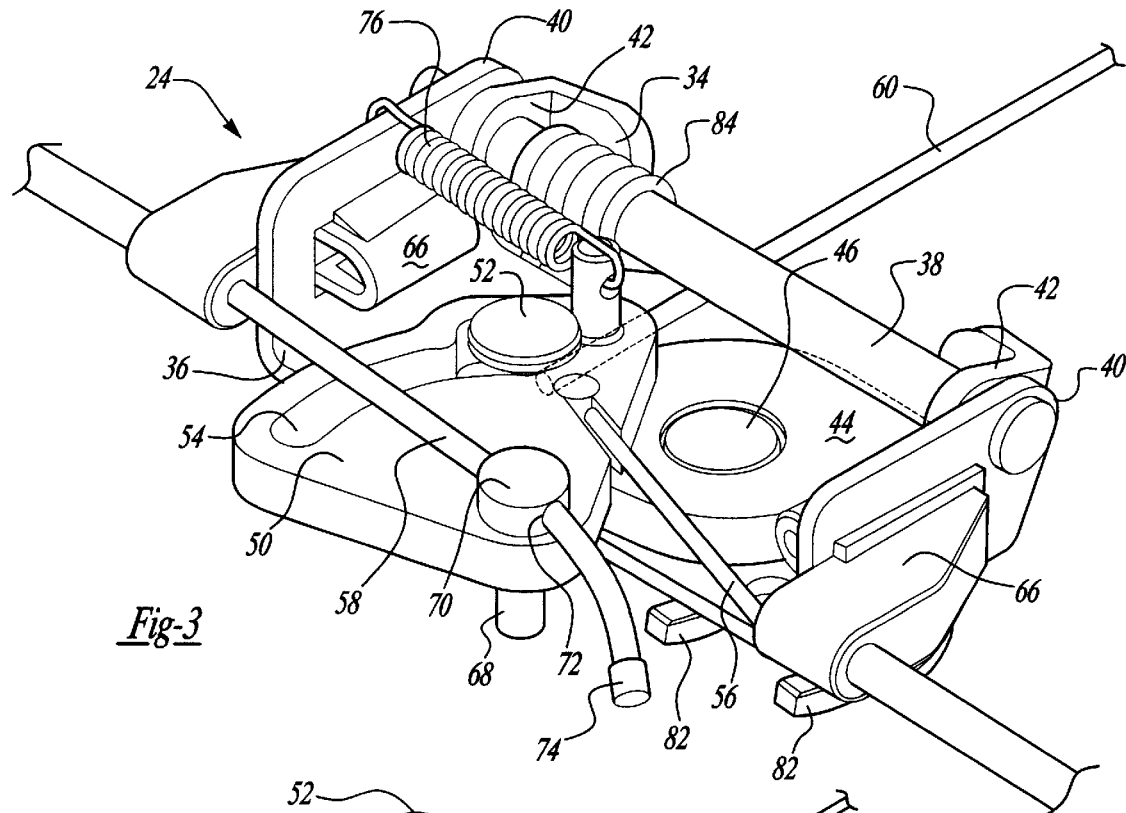
FIG. 3 is perspective view of a preferred embodiment of a seat track assembly designed according to this invention.

The assembly 24 is shown in a perspective view in FIG. 3. The mounting assembly 24 includes a locking pawl 34 that is supported on the upper track 32. Preferably, a mounting bracket 36 is fastened to the upper track 32 by fasteners (not shown). The locking pawl 34 is pivotally mounted to the mounting bracket 36 by at least one pivot member 38. Preferably, a single pivot member 38 extends between arms 40 of the mounting bracket 36 with arms 42 of the locking pawl 34 rotatably supported on the pivot member 38 adjacent to the arms 40 of the mounting bracket 36.

A release member 44 is pivotally supported on the mounting bracket 36 by a first pivot pin 46. The release member 44 includes an engaging portion 48 (shown in FIG. 4) that slidably engages the locking pawl 34 to move the locking pawl 34 between a locked or engaged position and an unlocked or disengaged position. Preferably, the engaging portion includes a curved surface. A bypass member 50 is preferably supported by the release member 44 on the upper track 32. The bypass member 50 is connected to the release member 44 by a second pivot pin 52. The second pivot pin is located in an arcuate slot 54 in the bypass member 50.

A first control member 56 is connected to the bypass member 50 and is responsive to pivotal movement of the seat back 26. A second control member 58 is attached to the bypass member 50 and is preferably responsive to pivotal movement of the seat bottom 22, however, the control member can be responsive to other actuation members such as a rod, bar, lever, or actuation button, for example. The first 56 and second 58 control members are preferably control cables that include a flexible core element slidably supported in a conduit member. Preferably, snap tabs members 66 are used to connect the control members 56, 58 to the mounting bracket 36.

A slave member 60 is preferably connected to the second pivot pin 52 and extends over to the other mounting assembly 24 on the outboard side of the seat 20. The second mounting assembly 24 is not always used, it is usually only needed if structural demands of the seat require it. When the second pivot pin 52 is actuated to rotate the release member 44 and move the locking pawl into the unlocked position, discussed in more detail below, the slave member 60 is tensioned to position the outboard side locking pawl in the unlocked position so that the upper track 32 can move relative to the lower track 30. The slave member 60 is preferably a control cable, however, a rod or spring member could also be used, for example.

As previously mentioned, the mounting assembly 24 on the inboard side of the seat 20 preferably includes the bypass member 50 and the release member 44 with a similar mounting assembly 24, if required for improved stability and performance, being located on the outboard side of the seat 20. The similar mounting assembly 24 typically includes a locking pawl 34 that is connected to the slave member 60 and does not have a release member 44 or a bypass member 50. It should be understood that the outboard mounting assembly 24 could includes its own bypass member 50 and/or release member 44 to be independently actuated so that the slave member 60 would be eliminated. It should also be understood that the positions of the mounting assemblies could be reversed such that the assembly 24 with the bypass member 50 and release member 44 is located on the outboard side of the seat 20 with the assembly 24 with the locking pawl 34 connected to the slave member 60 is on the inboard side.

Figure 4:
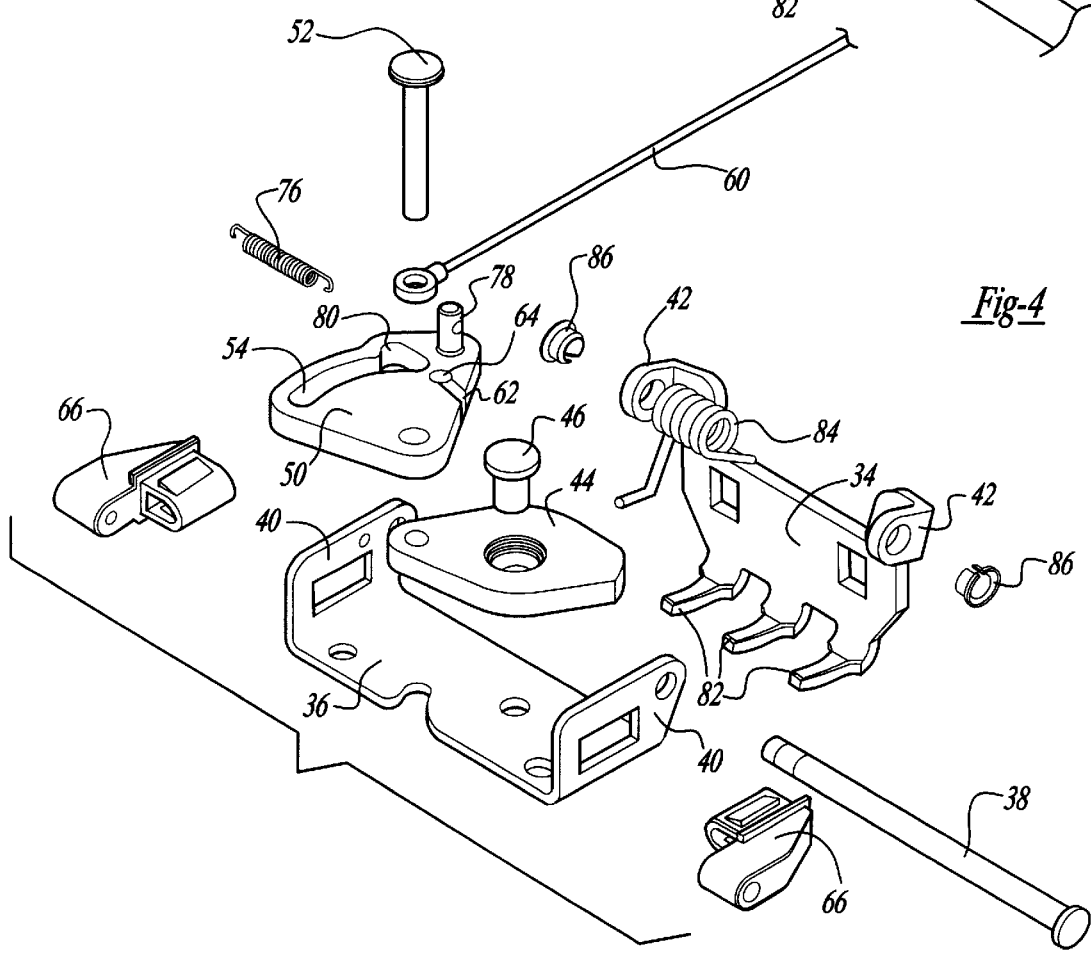
FIG. 4 is an enlarged, perspective, exploded view of the preferred embodiment of the seat track shown in FIG. 3.

FIG. 4 shows an exploded view of the assembly shown in FIG. 3. The bypass member 50 includes at least four (4) connection points. The first connection point includes the arcuate slot 54 for receiving the second pivot pin 52, as discussed above. At one end of the arcuate slot 54 is a linear slot 80 which interacts with the second pivot pin 52 when the pin 52 is actuated to rotate the release member 44, discussed in more detail below.

The second connection point is where the first control member 56 attaches to the bypass member 50. Preferably, this connection point includes a slot 62 and an aperture 64. One end of the first control member 56 is slid into the slot 62 such that it is held in the aperture 64 and cannot be removed therefrom.

The third connection point is where the second control member 58 attaches to the bypass member 50. Preferably, this connection includes a pin 68 extending through the bypass member 50. The pin 68 includes an enlarged head portion 70 with a cylindrical hole 72 extending generally perpendicular to the pin body 68. The second control member 58 has a cap 74 at one end. The second control member 58 is extended through the hole 72 and the cap 74, having a larger cross sectional area than the hole 72 prevents the second control member 58 from separating from the bypass member 50. The second control member 58 moves with respect to the pin 68 such that when the seat bottom 22 is in the horizontal position, i.e. an occupant can sit on the seat 20, the cap 74 is spaced apart from the pin 68 so that there is no tension in the control member 58. When the seat bottom 22 is pivoted into the vertical position, the control member 58 moves so that the cap 74 engages the head 70 putting tension in the control member 58.

A resilient member 76 extends between the mounting bracket 36 and the bypass member 50. The fourth connection is where the resilient member 76 attaches to the bypass member 50. Preferably, this connection is made by an extruded post 78 that extends upwardly from the bypass member 50. The resilient member 76 is preferably a spring with ends that hook to the post 78 and mounting bracket 36.

It should be understood that the references to the four connection points of the bypass member 50 are descriptive in nature and should not be considered limiting. The bypass member 50 may include more or less connection points, and some of the connection points discussed above could be combined together.

The locking pawl 34 includes at least one tooth member 82, shown in FIG. 4, which are received in slots (not shown) in the upper 32 and lower 30 tracks when the locking pawl 34 is in the locked position. Preferably, the locking pawl 34 includes three (3) teeth 82 in order to provide secure engagement of the pawl 34 to the tracks 32, 30. The locking pawl 34 is rotatably connected to a mounting bracket 36 on pivot member 38. A resilient member 84 is supported on pivot member 38 to bias the locking pawl 34 in the locked position. Release member 44 is linearly actuated by control member 56. The linear force on release member 44 causes it to rotate about the first pivot pin 46. As release member 44 rotates, it engages locking pawl 34 and overcomes the bias of resilient member 84 causing the locking pawl 34 to rotate the teeth 82 out of the slots and place the locking pawl 34 in the unlocked position. Bushings 86 are use to provide a bearing surface between the pivot member 38 and the locking pawl 34. Preferably, the bushings 86 are mode of plastic.

Figure 5:
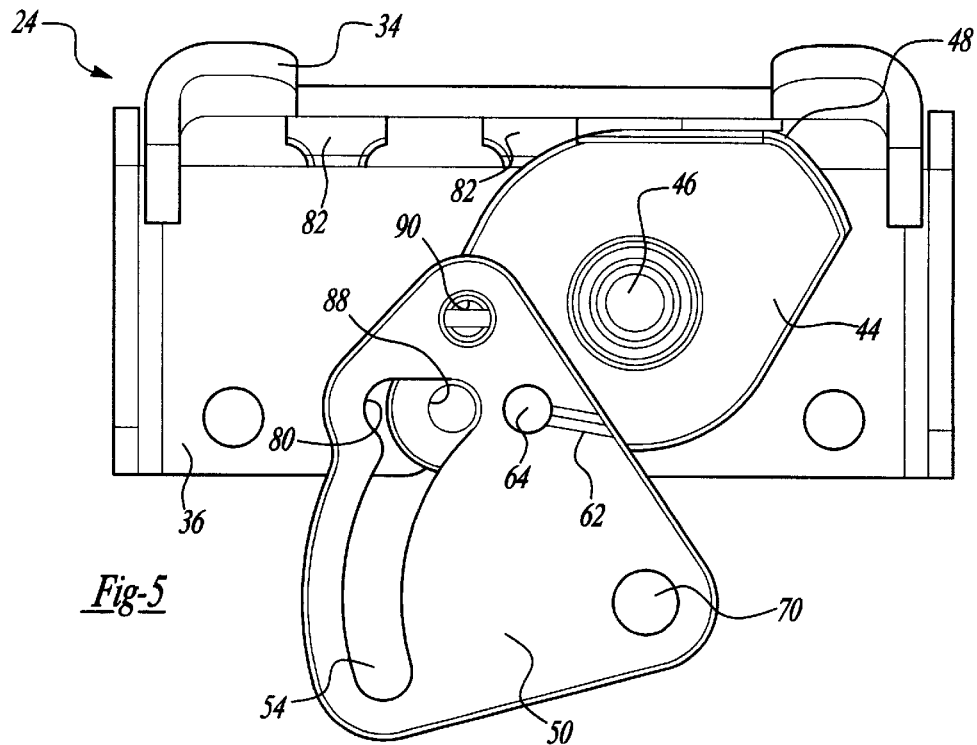
FIG. 5 is an overhead view of the preferred embodiment of the seat track assembly shown in FIG. 3 in the rest position.

The operation of the assembly 24 will be discussed in reference to FIGS. 5–8. FIG. 5 shows the assembly 24 in the rest or neutral position. This is when the seat back 26 is in the vertical position and the seat bottom 22 is in the horizontal position, i.e. a vehicle passenger can sit in the seat 20. In this position, the second pivot pin 52 which is received in an aperture 88 in the release member 44 and in slot 54 of the bypass member 50, is located adjacent to the linear slot portion 80 of the bypass member 50. The first control member 56, attached to the bypass member 50 at slot 62 and aperture 64, is not under load or tension and the second control member 58, attached to the bypass member 50 with the pin 68 having the enlarged head 70, is also not under load or tension. Because there is no load on the bypass member 50, the release member 44 cannot be rotated, thus, the locking pawl 34 is positioned in the locked position such that the teeth 82 are received in the slots of the upper 32 and lower 30 tracks and the upper track 32 is held fixed relative to the lower track 30.

Figure 6:
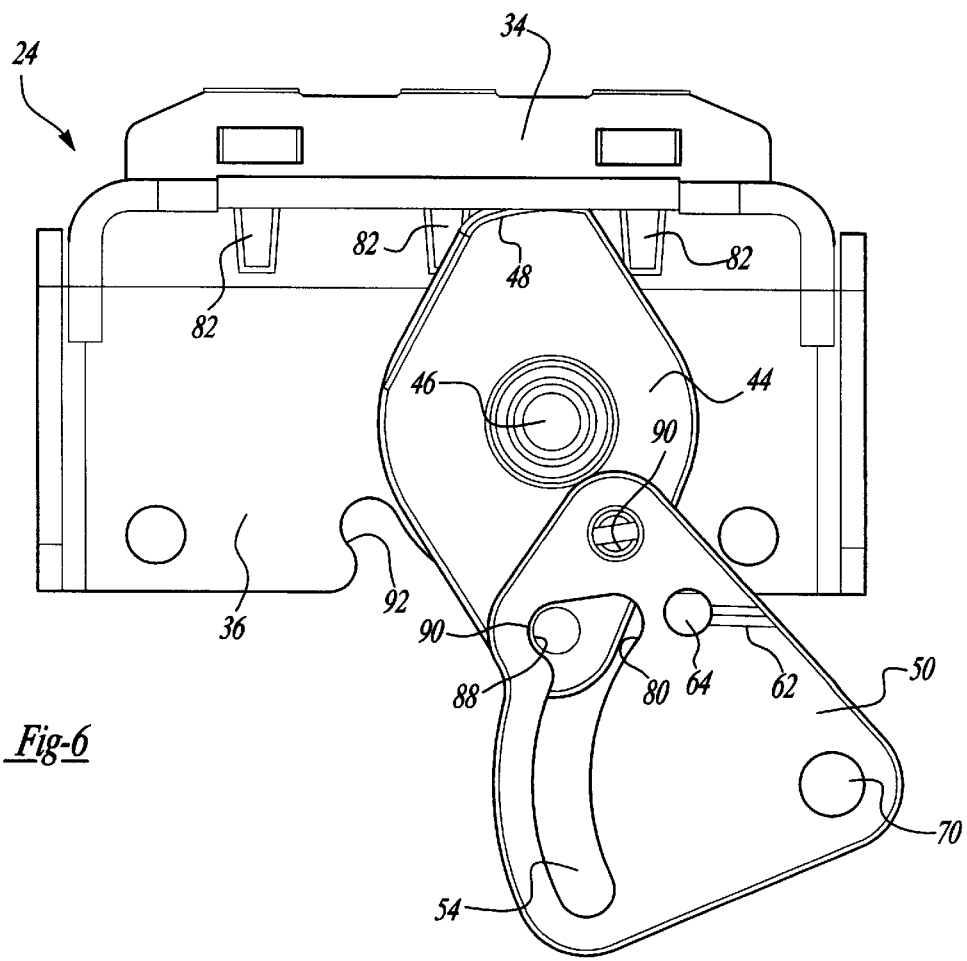
FIG. 6 is an overhead view of the preferred embodiment of the seat track assembly with the locking device in the unlocked position.

FIG. 6 shows the assembly in the unlocked position. In this position, the first control member 56 is placed in tension. Typically, the first control member 56 is responsive to pivotal movement of the seat back 26 so that tension is placed on the first control member 56 when the seat back 26 has been pivoted into an angular position relative to the seat bottom 22. However other actuation members such as a handle, lever, release mechanism, or an actuation button could be used to place the first control member 56 in tension.

When the first control member 56 is in tension, it pulls on the bypass member 50 with a lateral force causing the second pivot pin 52 to engage the linear slot portion 80 at an edge 90 furthest away from control member 56. When the pin 52 is in this position, it rotates the release member 44 and the bypass member 50 in a counter clockwise rotation about the first pivot pin 46 causing the release member 44 to engage the locking pawl 34. This rotates locking pawl 34 about pivot member 38 to disengage the teeth 82 from the tracks 32, 30. Thus, the linear actuation of control member 56 results in rotational movement of the locking pawl 34.

Once the locking pawl 34 is in the unlocked or disengaged position, the upper track 32 can move relative to the lower track 30. This allows the seat 20 to be slid forward so entry into the area behind the seat is improved. The second control member 58 attached at 70, is not under load or tension when the assembly is in the unlocked position, thus the pin 52 does not slide along the slot 54. When the passenger no longer needs access to the area behind the seat, the seat 20 is slid rearwardly along the lower track 30 such that pin 52 hits moveable or fixed placement block or tab (not shown) which causes the release member 44, the bypass member 40, and the pin 52 to rotate in a clockwise direction about pin 46 such that pin 52 is returned to its neutral position in a slot 92 in mounting bracket 36. The teeth 82 are received in the tracks 32, 30, returning the locking pawl 34 to the locked position. The seat back 26 is in the vertical position and the assembly is in the neutral position shown in FIG. 5. It should be understood that the references to clockwise and counterclockwise rotation is merely for descriptive purposes and is not limiting.

The bypass member can also be rotated independent from the release member to allow re-engagement of the locking device 34 with having to actuate a control member. After the locking device is disengaged, the bypass member could be activated by the second control member or by an independent contact point such that the bypass member 50 would become independent of the release member 44, allowing the locking device 34 to re-engage independent of the first control member.

FIG. 7 shows the bypass member 50 in the bypass position. This is the position the assembly 24 is in when the seat 20 is folded down to achieve a load floor position. This means that the seat bottom 22 is pivoted into a vertical position and the seat back 26 is pivoted into a horizontal position. The back surface of the seat back 26 then becomes a floor portion so that cargo space in the vehicle is increased.

When the seat bottom 22 is pivoted forwardly into the vertical position, tension is placed on the second control member 58 causing cap 74 to engage the head portion 70 of pin 78 attached to bypass member 50. Then, the seat back 26 is pivoted downwardly and forwardly into a horizontal position, placing the first control member 56 in tension. Thus, the first control member 56 is exerting a force on the bypass member 50 in one direction and the second control member 58 is exerting a force on the bypass member 50 in a second direction which is substantially opposite from the first direction.

When the first control member 56 is placed in tension, it causes the bypass member 50 to rotate about the pin 68, i.e. about 70 as shown in FIG. 7. Thus, the pivot point for the bypass member 50 is different than the pivot point of the bypass member 50 when it is rotated into the unlocked position. As the bypass member 50 rotates about point 70, the second pivot pin 52 slides along the arcuate slot 54 so that it engages a slot end 94 that is opposite from the linear slot portion 80. This means that pin 52 does not cause the release member 44 to rotate and thus the locking pawl 34 remains in the locked position.

When the bypass member 50 is in the bypass position the seat 20 can be folded down without having the seat slide forward. As discussed above, this is accomplished by having the bypass member 50 rotate independently from the release member 44 so that the locking pawl 34 remains in the locked position.

FIG. 9 shows an end view of the assembly 24 with the locking pawl 34 in the locked position and the teeth 82 received in the tracks 32, 30. This position corresponds to the top view of the neutral position of the assembly shown in FIG. 5.

The subject invention disclosed above offers the advantage of having a single mounting assembly 24 that offers various functions. The assembly 24 allows the locking pawl 34 to be disengaged to allow the seat to be slid forward for entry into a rear area behind the seat and also allows the seat to be folded down without having the locking pawl 34 becoming disengaged.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. An assembly for mounting a seat within a vehicle comprising:
   a first track;
   a second track supported for movement relative to said first track ;
   a locking device supported on said second track and moveable between a locked position where said locking device maintains said second track in a fixed position and an unlocked position where said second track is movable relative to said first track;
   a release member for moving said locking device out of said locked position and maintaining said locking device in said unlocked position such that said second track can move relative to said first track; and
   a bypass member for moving into a bypass position wherein said bypass member can move independently from said release member such that said locking device remains in said locked position when a control mechanism is actuated.

2. An assembly as recited in claim 1 wherein said release member is rotatably connected to said second seat track by a first pivot pin.

3. An assembly as recited in claim 2 wherein said bypass member is rotatably connected to said release member by a second pivot pin, said bypass member being able to rotate independently from said release member.

4. An assembly as recited in claim 3 wherein said bypass member includes an arcuate slot for receiving said second pivot pin.

5. An assembly as recited in claim 4 including a control member attached to said bypass member wherein said second pivot pin slides within said arcuate slot as said control member rotates said bypass member into said bypass position.

6. An assembly as recited in claim 4 including a control member attached to said bypass member wherein said second pivot pin remains at one end of said arcuate slot as said control member is actuated such that said second pivot pin causes said release member to rotate with respect to said second track to release said locking device from the locked position.

7. An assembly for mounting a seat within a vehicle comprising:
   a first track;
   a second track supported for movement relative to said first track;
   a locking device supported on said second track for movement between an unlocked position and a locked position where said locking device maintains said second track in a selected position relative to said first track;
   a release member actuated by a control member and supported on said second track for selectively moving said locking device into and out of said locked position; and
   a bypass member that selectively moves into a first bypass position when said locking device is in said unlocked position such that said bypass member can move independently from said release member to allow said locking device to return to said locked position independent of said control member.

8. An assembly as recited in claim 7 wherein said bypass member is selectively moveable into a second bypass position wherein said bypass member can move independently from said release member such that said locking device remains in said locked position when said control member is actuated.

9. An assembly as recited in claim 8 wherein said release member is rotatably connected to said second seat track by a first pivot pin and said bypass member is rotatably connected to said release member by a second pivot pin.

10. An assembly as recited in claim 9 wherein said bypass member is actuated by a first bypass control member and a second bypass control member, said first bypass control member being responsive to an actuation of a first seat member and said second bypass control member being responsive to an actuation of a second seat member.

11. An assembly as recited in claim 10 wherein said locking device moves out of said locked position when said first control member applies a lateral force to said second pivot pin causing said bypass member and said release member to pivot about said first pivot pin such that said release member slidably engages said locking device, moving it out of said locked position.

12. An assembly as recited in claim 11 wherein said second seat member is in a generally horizontal position and said first seat member is in an angular position with respect to said second seat member when said release member positions said locking device in said unlocked position such that said first seat member and said second seat member are able to move with respect to said first track.

13. An assembly as recited in claim 10 wherein said second control member is attached to said bypass member at a pivot point, said pivot point being spaced apart from said second pivot pin.

14. An assembly as recited in claim 13 wherein said second control member applies a first force in a first direction on said bypass member when said second seat member is pivoted into a generally upright position and said first control member applies a second force in a second direction to said bypass member when said first seat member is pivoted downwardly toward said second seat member causing said bypass member to rotate about said pivot point such that said locking device remains in said locked position while allowing said first seat member to be pivoted downwardly to a generally horizontal position.

15. An assembly as recited in claim 10 wherein said bypass member includes an arcuate slot with a linear slot portion at one end.

16. An assembly as recited in claim 15 wherein said second pivot pin engages said linear slot portion when said first control member causes said bypass member and said release member to rotate about said first pivot pin.

17. An assembly as recited in claim 15 wherein said second pivot pin moves within said arcuate slot when said first control member causes said bypass member to rotate independently from said release member when said first seat member is pivoted into a generally horizontal position.

18. A vehicle seat assembly comprising
   a seat bottom;
   a seat back pivotally supported for pivotal movement relative to said seat bottom;

a first track;

a second track supported for movement relative to said first track, said seat bottom being supported on said second track for movement with said second track;

a locking device supported on said second track for movement into and out of a locked position where said locking device maintains said second track in a selected position relative to said first track;

a release member rotatably connected to said second track by a first pivot pin, said release member for selectively moving said locking device into and out of said locked position; and a bypass member rotatably connected to said release member by a second pivot pin wherein said bypass member is connected to a first control member and a second control member, said first control member being responsive to an movement of said seat back and said second control member being responsive to an actuation member operably connected to said seat bottom.

19. A seat assembly as recited in claim 18 wherein said bypass member and said release member rotate about said first pivot pin when said seat bottom is in a generally horizontal position and said seat back is pivoted downwardly toward said seat bottom such that said locking device moves out of said locked position allowing said second track to move relative to said first track.

20. A vehicle seat assembly comprising:

a seat bottom;

a seat back pivotally supported for pivotal movement relative to said seat bottom;

a first track;

a second track supported for movement relative to said first track, said seat bottom being supported on said second track for movement with said second track;

a locking device supported on said second track for movement into and out of a locked position where said locking device maintains said second track in a selected position relative to said first track;

a release member rotatabley connected to said second track by a first pivot pin, said release member for selectively moving said locking device into and out of said locked position; and a bypass member rotatabley connected to said release member by a second pivot pin, said bypass member being connected to a first control member and a second control member, said first control member being responsive to an actuation member operably connected to said seat back and said second control member being responsive to movement of said seat bottom, wherein said bypass member rotates independently from said release member when said seat bottom is in a generally upright position such that said locking device remains in said locked position and wherein said bypass member can be actuated by said second control member to move independently from said release member to allow said locking device to return to said locked position independent of said first control member.

* * * * *